United States Patent [19]

Willen

[11] Patent Number: 4,672,588
[45] Date of Patent: Jun. 9, 1987

[54] METHOD FOR DISPLAYING ACOUSTIC WELL LOGGING DATA BY PRODUCING TRAVEL TIME STACKS

[75] Inventor: Dennis E. Willen, Houston, Tex.

[73] Assignee: Exxon Production Research Co., Houston, Tex.

[21] Appl. No.: 684,994

[22] Filed: Dec. 20, 1984

[51] Int. Cl.$^4$ ............................................. G01V 1/00
[52] U.S. Cl. ...................................... 367/28; 367/30; 367/69
[58] Field of Search ..................... 367/69, 68, 21, 62, 367/28, 29, 30, 74; 364/421, 33 WL

[56] References Cited

U.S. PATENT DOCUMENTS

| 4,203,161 | 5/1980 | Johnson et al. | 367/40 |
| 4,543,648 | 9/1985 | Hsu | 367/29 |
| 4,562,557 | 12/1985 | Park et al. | 367/38 |
| 4,575,830 | 3/1986 | Ingram et al. | 367/26 |
| 4,594,691 | 6/1986 | Kimball et al. | 367/26 |

FOREIGN PATENT DOCUMENTS 1175700 12/1969 United Kingdom .
1349496 4/1974 United Kingdom .

*Primary Examiner*—Thomas H. Tarcza
*Assistant Examiner*—Daniel T. Pihulic
*Attorney, Agent, or Firm*—Alfred A. Equitz

[57] ABSTRACT

A method for producing a display of acoustic signals received during full waveform acoustic well logging. In a preferred embodiment, the signals received at the individual receiver (or receivers) of the logging tool are stacked along lines of constant acoustic velocity to produce for display a stacked signal. Preferably, the raw signals are weighted prior to the stacking step, to compensate for decreasing amplitude of the acoustic arrival of interest with increasing transmitter to receiver distance. The stacked signals produced may be displayed in various formats, such as on a linear or logarithmic scale of inverse acoustic velocity, or of formation porosity. In a preferred embodiment, resulting in production for display of stacked signals providing greater resolution in the direction of the borehole axis, pairwise stacked signals are produced from data received at adjacent receivers, and after two or more acoustic transmitter firings at distinct positions in the borehole, the pairwise stacked signals associated with common depth intervals are added together and the resulting common depth stacks for each depth interval are displayed. The method makes full use of the entire wavetrain of the individual receiver signals processed in accordance therewith, and is sufficiently efficient to facilitate processing and display of acoustic logging data at the well site.

31 Claims, 8 Drawing Figures

METHOD FOR DISPLAYING ACOUSTIC WELL LOGGING DATA BY PRODUCING TRAVEL TIME STACKS

FIELD OF THE INVENTION

This invention relates to methods for acoustic well logging. More particularly, the invention relates to methods for processing and displaying acoustic data received during acoustic well logging operations.

BACKGROUND OF THE INVENTION

In acoustic well logging, it is customary to transmit an acoustic signal from a transmitter in a borehole containing fluid and to receive the resulting acoustic wave train at each of two or more acoustic receivers disposed in the borehole at locations spaced along the borehole axis from each other and from the transmitter. When the acoustic signal generated by the transmitter reaches the borehole wall, it produces an acoustic compressional wave and an acoustic shear wave, both of which, in general, will propagate through and be refracted in the formation traversed by the borehole until they are refracted back into the borehole fluid and are then detected at one or more of the receivers. In slow formations (in which the shear wave velocity is less than the acoustic velocity in the borehole fluid), the shear wave cannot refract back into the borehole, though, in general, the compressional wave can. When the acoustic signal generated by the transmitter reaches the borehole wall, it will also produce modal waves, as well as a Stoneley wave. These are surface waves strongest at the interface between the borehole fluid and the surrounding formation. The modal waves and the Stoneley wave will, in general, also propagate away from the transmitter and subsequently be detected at one or more of the receivers.

Any wave that is one of the mentioned types of waves detected at the receivers may be called an "arrival". The detected compressional waves in the borehole fluid caused by refraction of compressional waves (sometimes referred to as "P waves" hereinafter) in the formation traversed by the borehole will be referred to herein as "compressional wave arrivals". The detected compressional waves in the borehole caused by refraction of shear waves (sometimes referred to as "S waves" hereinafter) in the formation will be referred to herein as "shear wave arrivals". The detected compressional waves in the borehole fluid caused by Stoneley waves will be referred to herein as "Stoneley wave arrivals".

Thus, the full acoustic wave train received at each receiver will, in general, be a composite signal which includes a compressional wave arrival, a shear wave arrival, and a Stoneley wave arrival. Usually in such composite signal, the compressional wave arrival will be detected first and thus be the first arrival. The shear wave arrival will usually be the second arrival and the Stoneley wave arrival the last arrival.

FIG. 1 shows twelve full wave train signals of the type described above, each received at a different acoustic receiver spaced at a different distance from a common transmitter. Increasing distance downward on FIG. 1 represents increasing actual distance away from the transmitter along the borehole axis. Increasing horizontal distance toward the right of FIG. 1 represents increasing time following transmission of an acoustic pulse by the transmitter.

In a conventional processing scheme, the early portion of each full wave train signal of the type shown in FIG. 1 is analyzed to determine the level of acoustic and electronic noise present. The first arrival is identified as the earliest local maximum to exceed the noise level by some preselected amount. Two or more cycles of the first arrival are analyzed to determine its magnitude and the search is continued for later arrivals, using other preset trigger levels. Travel times and attenuation lengths are computed from the time and magnitude of the arrivals in adjacent receivers. Accuracy may be increased by, for example, calculating cross-correlation or semblance functions for small time windows about the picked arrivals.

The conventional processing method described above suffers from several drawbacks, including the following:

(1) The trigger levels which must be preset are complicated functions of the transmitter strength, receiver sensitivity, geometric falloff and formation attenuation. There is no reason to expect triggers set in one interval to remain valid in any adjacent interval. Cycle skipping is a serious problem unless the logging tool provides redundant measurements from several receivers. To make frequent changes in the trigger levels during processing is nearly as time-consuming as picking the arrivals by hand.

(2) In order to make the shear and Stoneley arrivals more distinct from the other modal energy, the data must be filtered in software. This extra work increases the computation time by a factor of about twenty.

(3) One must also preset time windows to evaluate the noise levels and to search for the various arrivals. Attempts to adjust these windows during the arrival picking process run the risk of confusing compressional and shear wave arrivals altogether. In this respect, the conventional processing method is little better than picking the arrivals by hand.

(4) The conventional method is slow. Even without software filtering, a mainframe computer can only perform the algorithm at about half the speed at which the data is collected.

(5) The conventional method assumes a very specific model of wave propagation in a borehole. There is no provision for dispersive modal energy, reflections from horizontal interfaces or refractions from the edge of the invaded zone. Conversely, the method does not automatically eliminate these arrivals.

(6) The conventional processing method discards nearly all of the data from a multiple receiver, full waveform tool. This last point requires some elaboration. Conventional full waveform acoustic logging systems produce large amounts of data. For example, such conventional systems may typically digitize received wavetrains having a length of 10 milliseconds, at 5 microsecond sample rate. Such a system may typically have twelve receivers, and may typically be used to log an interval 3,000 feet or more in length along a borehole, at half foot intervals. The amount of resulting data is several hundred thousand times the amount of data typically obtained by using a conventional induction or gamma ray tool to log the same interval. Rather than process all this data, the conventional method discards almost all of it. The log analyst is left with only a few millionths of the data and with no way to recover from faulty presets in the computer program.

The method of the present invention, in contrast, facilitates the processing and displaying of data from full acoustic wavetrain logs in a manner which is not only faster than the conventional technique described above, but is such that more of the useful information in the wavetrains to be processed is retained in the resulting display. The present invention also avoids the problems, arising as the result of performing the conventional technique, which are associated with the selection of incorrect peaks.

SUMMARY OF THE INVENTION

The method of the present invention produces a display of acoustic signals received during full waveform acoustic well logging. In a preferred embodiment, the raw signals received at the individual receiver (or receivers) of the logging system employed are added (or "stacked") along lines of constant acoustic velocity (also referred to herein as "travel time lines"), to produce for display a stacked signal (sometimes referred to herein as a "travel time stack"). In such preferred embodiment, the individual raw signals are weighted, prior to the stacking operation, to compensate for decreasing amplitude of the acoustic arrivals of interest with increasing transmitter to receiver distance.

Each travel time line may be visualized by considering a group of individual receiver signals, all associated with a common shot point (i.e. with a single position along the borehole axis from which a pulse of acoustic energy is emitted), and displayed in side-by-side relationship, such as in FIG. 1, in order of increasing transmitter to receiver distance. Each travel time line associated with such data display is a line drawn across the individual signals, having slope equal to a possible velocity of an acoustic arrival, and intercepting the apparent position of the transmitter at the transmitter firing time.

In another preferred embodiment, a display is produced of acoustic signals received during full waveform acoustic well logging using a system having $N+1$ receivers (where $N$ is an integer greater than zero) in which measurements are made with a transmitter at each of at least two shot points (the phrase "shot point" will be used herein to denote the location of a transmitter at the time it is caused to emit a pulse of acoustic energy). The system may include at least two transmitters which are fired sequentially while the receivers remain fixed, or one transmitter which is fired once for each receiver array location. In this embodiment, the raw signals associated with the $N$ pairs of adjacent receivers associated with each emission of an acoustic pulse at a particular shot point are stacked along travel time lines to produce $N$ stacked signals for each shot point, each stacked signal being associated with the shot point and a pair of adjacent receivers. Then, for each depth interval in the borehole traversed by a pair of adjacent receivers, all the stacked signals associated with such depth interval (each such stacked signal being associated with a different emission of an acoustic pulse at a shot point) are added together and the resulting signal for each depth interval is displayed.

The method of the invention may be implemented in either software or hardware. The method is preferably implemented in hardware by digitizing each raw individual receiver signal at a rate which depends on the source-to-receiver distance associated with the signal and then employing hardwired addition circuits to form sums of the digitized points associated with a common acoustic velocity. To perform desired signal weighting prior to forming such sums, suitable hardwired multiplication circuits are employed. In an alternative embodiment, the invention is implemented in hardware via analog addition and multiplication circuits capable of performing the method of the invention to process analog individual receiver signals.

The method of the invention makes full use of the entire wavetrain of each individual receiver signal to be processed in accordance with the method, to produce a novel display of acoustic logging data. In contrast with conventional acoustic logging data processing techniques, the method of the invention does not require preset time windows and trigger levels. The inventive method makes direct use of multiple receivers of a logging tool to cancel modal energy, refractions from the edge of the invaded zone of the formation traversed by the borehole, and reflections from bed boundaries or horizontal fractures. The method is sufficiently efficient to facilitate the processing and displaying of acoustic well logging data at the well site.

DETAILED DESCRIPTION OF THE INVENTION

Figures 2, 5:
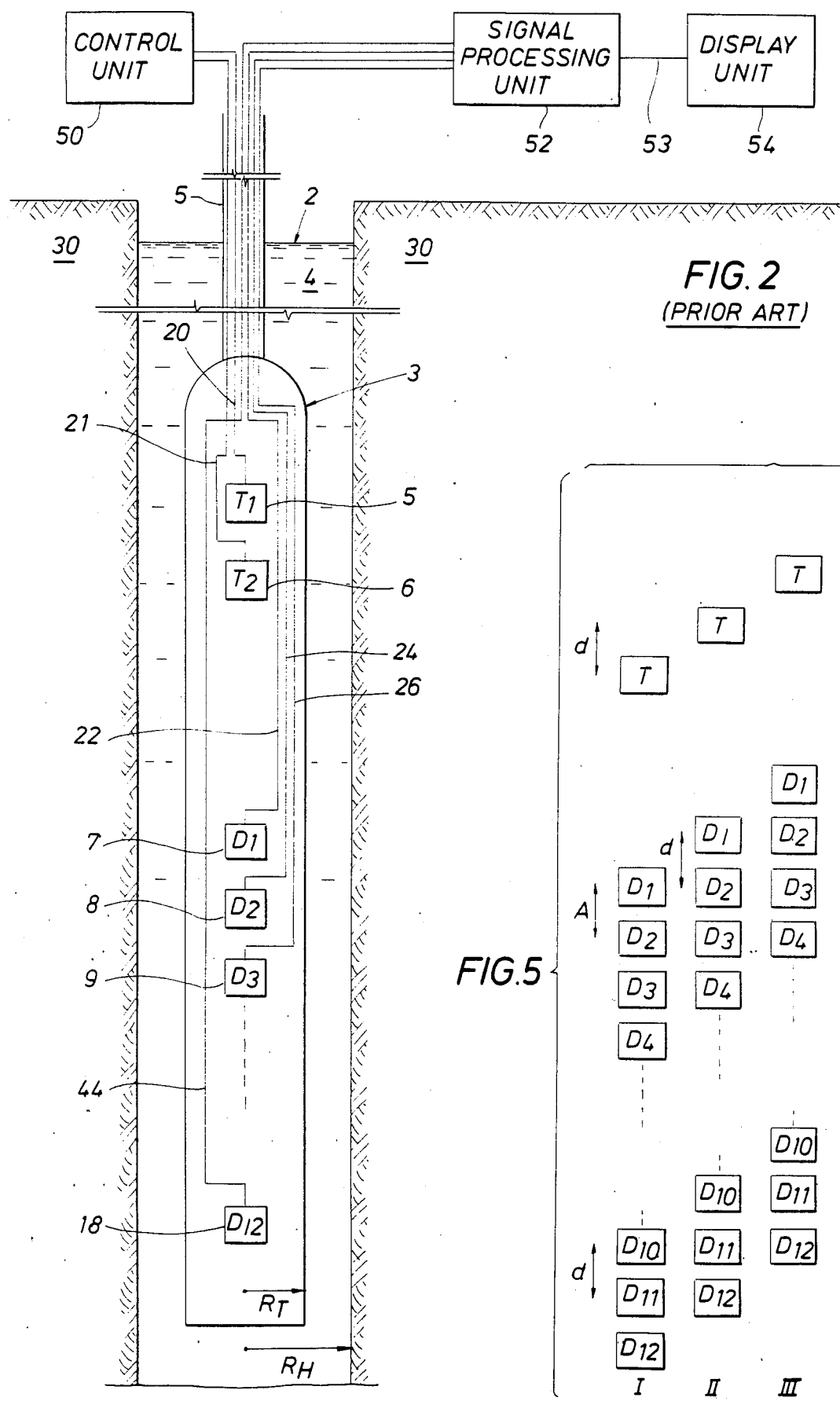
FIG. 2 is a schematic diagram of a conventional acoustic well logging system including two transmitters and twelve receivers (only four of which are shown), adjacent ones of the receivers being evenly spaced along the longitudinal axis of the borehole in which the system is disposed.
FIG. 5 is a schematic diagram representing four successive positions of an acoustic logging system having a transmitter and twelve receivers, as the system is moved along the borehole axis.

The invention is a method and system for processing and displaying data received during acoustic well logging operations which employ an acoustic logging tool of the type shown schematically in FIG. 2 as logging tool 3. Logging tool 3 is suspended by cable 5 in borehole 2 containing fluid 4. Borehole 2 traverses subterranean formation 30. Tool 3 includes acoustic transmitters 5 and 6 and acoustic receivers 7 through 18 (eight receivers, receivers 10 through 17, are not shown in FIG. 2 for simplicity). In order to simplify the description, it will be assumed that the distance between each pair of adjacent receivers is the same. It is not essential to the invention that the receivers be so evenly spaced. Although tool 3 has twelve receivers and two transmitters, the invention is also useful for processing and displaying data obtained using an acoustic logging tool having more than or less than twelve (but at least two) receivers and having any number of transmitters, or obtained using a tool having at least two transmitters and any number of receivers. Such variations on the method of the invention will be discussed below.

Transmitter 5 and transmitter 6 are each electrically connected to control unit 50. Control unit 50 energizes selected ones of transmitters 5 and 6 at selected times. Acoustic signals resulting from acoustic energy transmitted from transmitter 5 or 6 are received at each of receivers 7 through 18, and the received signals from receivers 7 through 18 are transmitted respectively on lines 22-44 (lines 28-42 are not shown in FIG. 2) which extend within cable 5 to signal processing unit 52. The output of signal processing unit 52 is displayed in display unit 54, which is electrically coupled to signal processing unit 52 by line 53. It will be recognized that in an alternate embodiment, the received signals from receivers 7 through 18 may be transmitted on lines 22-44 to a recording unit (not shown in FIG. 2), and thereafter the recorded signals may be read out of the recording unit and provided to signal processing unit 52 for processing.

It will also be recognized that in a variation on the system shown in FIG. 2, lines 22-44 are electrically coupled to a cable capable of transmitting data from only a single receiver at one time to signal processing means at the surface. In such a variation, selected individual receivers are monitored sequentially, such as during periods immediately following sequential firings of selected ones of the transmitters. Also, it will be recognized that the signals received at the individual receivers may be digitized in the borehole and transmitted uphole as binary words. In this latter embodiment, several digitized signals, each from a different receiver, may be multiplexed and transmitted uphole on a single channel.

Figure 1:
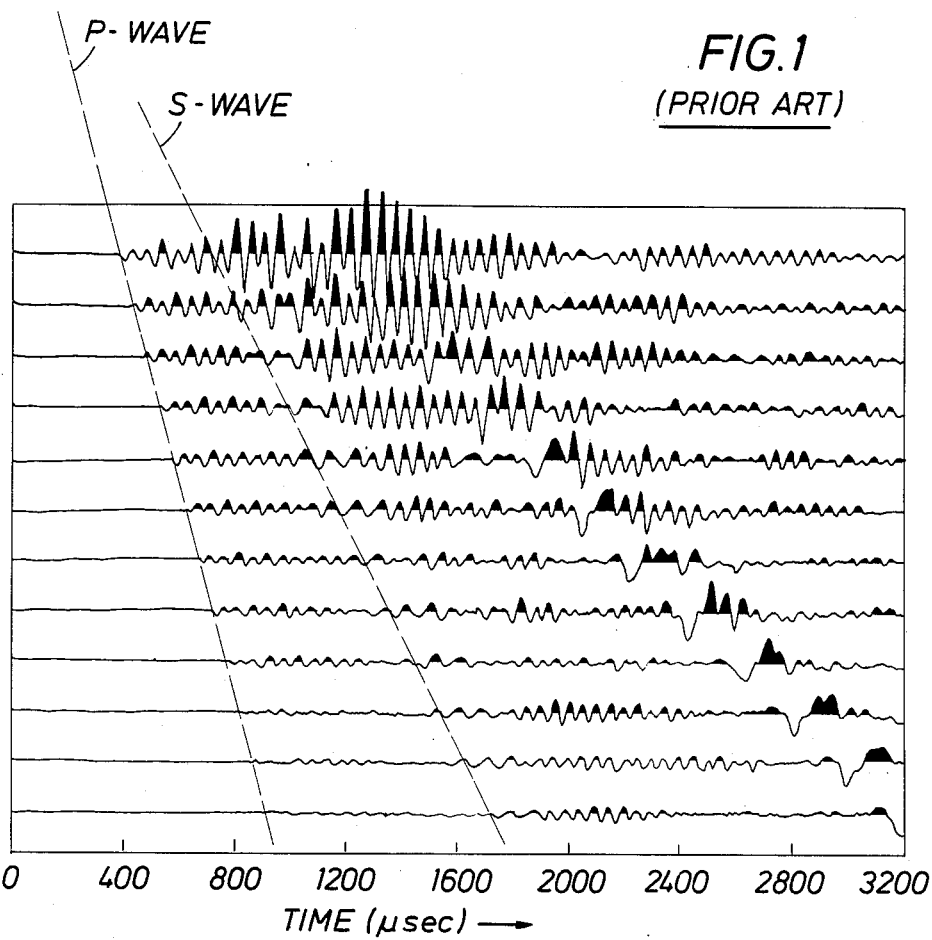
FIG. 1 is a conventional display of twelve acoustic signals, each one received at a different receiver of a single transmitter, multiple receiver acoustic logging system. The signals are sorted in order of increasing transmitter-to-receiver distance, so that the signal received at the receiver nearest the transmitter is at the top of FIG. 1. Increasing horizontal distance to the right, away from the vertical axis, represents increasing time after firing of the transmitter.
Figure 3:
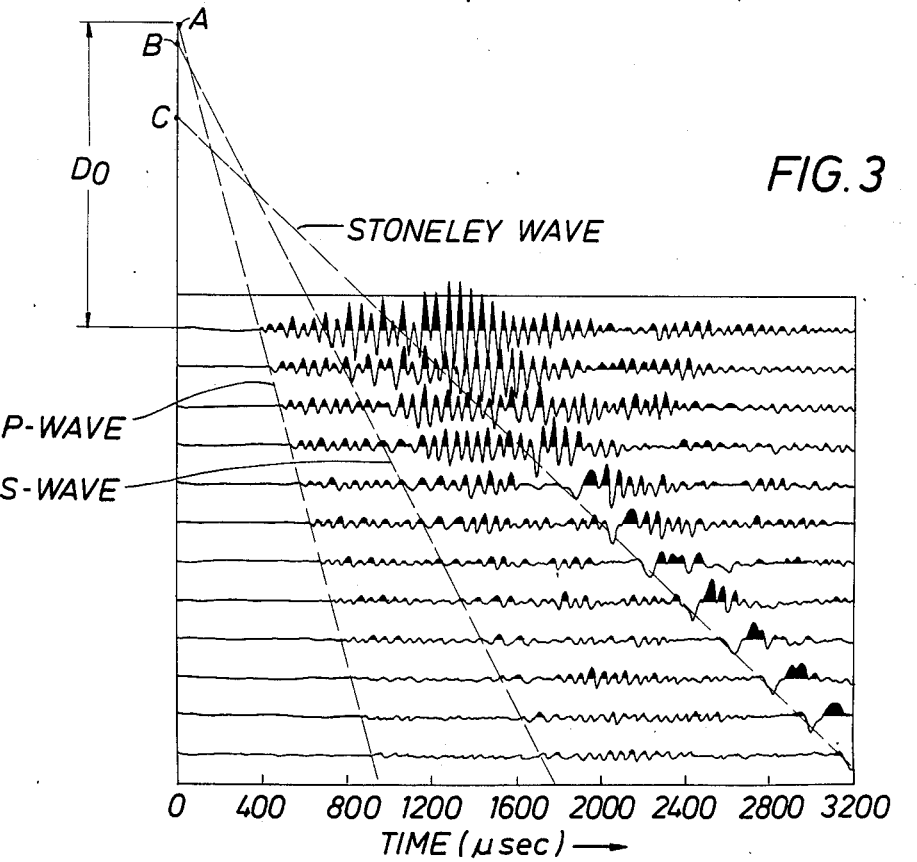
FIG. 3 is a display, of the same type as shown in FIG. 1, of twelve acoustic signals, each one received at a different receiver of a multiple receiver acoustic logging system. Three travel time lines are superimposed on the display.

A preferred embodiment of the method of the invention may be understood with reference to FIG. 3. FIG. 3 is a conventional display of twelve acoustic signals, each one received at a different receiver of a multiple receiver acoustic logging system of the type described above with reference to FIG. 2. The signals are sorted in order of increasing transmitter-to-receiver distance so that the signal displayed at the top of FIG. 3 is associated with the receiver nearest the transmitter (receiver 7 in FIG. 2) and the receiver signal at the bottom of FIG. 3 is associated with the receiver farthest from the transmitter (receiver 18 of FIG. 2). All twelve signals are associated with a common shot point. Vertical distance in FIG. 3 is proportional to actual position along the longitudinal axis of the borehole, so that the even spacing of the twelve signals in FIG. 3 indicates that the associated twelve receivers were evenly spaced along the longitudinal axis of the borehole.

An analyst may sometimes identify refracted and other non-dispersive arrivals from data such as that shown in FIG. 3 by the way they appear to move across the received signals. However, under a variety of conditions, such as when the receivers are too few in number or positioned too closely to the transmitter, it is extremely difficult for an analyst to disentangle the S wave and Stoneley wave arrivals from the other modal energy.

The refracted arrivals identified from a display of the type shown in FIG. 3, will appear to emanate from the apparent position of the transmitter from which the energy in the signals originated relative to the receivers. Such apparent position will sometimes be referred to herein as the "apparent shot point". For acoustic logging tools which the transmitter and receivers are positioned in the borehole, on or near the borehole axis and away from the borehole wall, the actual distance from the shot point to any receiver will be less than the apparent distance between the transmitter and the receiver because of the critical refraction at the borehole wall of the acoustic signal propagating away from the transmitter. The apparent distance, D, between the transmitter and any one of the receivers, for an acoustic arrival at the receiver, is given by (1) $D = D_T + 2(R_H - R_I)((V^2/V_m^2) - 1)^{1/2}$, if $V_m < V$; or $D = D_T$, if $V_m \geq V$. In equation (1), $D_T$ is the actual distance between the transmitter and the receiver, V is the velocity (in the formation adjacent the borehole) of the acoustic arrival, $V_m$ is the acoustic velocity in the borehole fluid between the transmitter and the receiver, and $R_H$ and $R_T$ are respectively, the borehole radius and logging tool radius.

If $V_m < V$, the acoustic arrivals are refractions traveling down the borehole wall, and equation (1) is derived from Snell's law. If $V \leq V_m$, the arrivals are either mud wave arrivals or the Stoneley wave arrival, and appear to emanate from the actual position of the transmitter.

Thus, the apparent distance, D, between the transmitter and any given receiver of the system depends on the velocity in the formation adjacent the borehole, of the acoustic arrival at the receiver. Any positive, finite velocity is a possible velocity of such an acoustic arrival. The slope of each line, having negative slope, drawn across the data display shown in FIG. 3 has slope which corresponds to one of such possible acoustic velocities.

In general, randomly drawn straight lines having negative slope and passing through the apparent position of the transmitter (the "apparent shot point") on the vertical axis of FIG. 3 (i.e., at the firing time of the transmitter), will pass through both peaks and troughs of the wavetrains. By simply adding the values of the wavetrains along these lines of constant velocity (sometimes referred to herein as "travel time lines"), the peaks and troughs tend to cancel except where the slope of the travel time line is equal to the velocity of an acoustic arrival, where the peaks (or troughs) tend to reinforce.

Three such travel time lines associated with acoustic arrivals are indicated by dashed lines superimposed on the wavetrains of FIG. 3. The travel time line through apparent shot point A has slope equal to the velocity in the formation traversing the borehole of the P wave arrival at the receivers. The travel time line through apparent shot point B has slope equal to the velocity in the formation of the S wave arrival at the receivers. The travel time line through apparent shot point C has slope equal to the velocity of the Stoneley wave arrival at the receivers.

A preferred embodiment of the method of the invention includes the following steps. First, an acoustic arrival is identified from a set of acoustic well logging signals, each signal having been received at a different receiver of a multiple-receiver acoustic logging tool. The apparent shot point and acoustic velocity associated with the travel time line through such arrival are also identified. The acoustic arrival may be identified by any conventional technique, such as the technique described above in the section entitled "Background of the Invention".

Having identified such apparent shot point, the apparent distance between the transmitter and each of the receivers is determined by recognizing that the following relation is satisfied: $D_2 - D_1 = d_1 - d_2$, where $d_1$ is the actual position along the borehole axis of any one of the receivers, $d_2$ is the actual position along the borehole axis of any other one of the receivers, $D_1$ is the distance between the apparent shot point and said one of the receivers, and $D_2$ is the distance between the apparent shot point and said other one of the receivers.

Thereafter, a stacked signal is generated by adding the amplitudes of the individual receiver signals along each of a plurality of travel time lines, such as the three superimposed on the wavetrains of FIG. 3. The stacked signal is subsequent displayed. The stacked signal will have a particular amplitude for each acoustic velocity (or inverse velocity) of a travel time line along which stacking was performed. An analyst may associate peaks in the stacked signal with the acoustic velocities of acoustic wave arrivals, such as the compressional wave arrival, shear wave arrival, and the Stoneley wave arrival. An analyst may also interpret the amplitudes of these peaks as being indicative of the formation attenuation properties.

The travel time lines along which the individual receiver signals are stacked are preferably determined as follows. The apparent position of the transmitter associated with each of a plurality of possible acoustic velocities of an acoustic arrival at the receivers is determined using a modification of equation (1). The manner in which this is done may be understood by recognizing that by performing trivial algebra on equation (1), one arrives at the expression:

$$2 D = D_T + (D_o - D_T)((V^2/V_m^2) - 1)^{\frac{1}{2}}((V_o^2/V_m^2) - 1)^{-\frac{1}{2}}, \quad (2)$$

for $V > V_m$; and $D = D_T$, for $V \leq V_m$, where D is the apparent distance between the transmitter and a given one of the receivers, V is the velocity of any acoustic arrival at the receiver, $D_T$ is the actual distance between the transmitter and the receiver, $V_o$ is the velocity of the previously identified acoustic arrival, $D_o$ is the apparent distance associated with the previously identified acoustic arrival between the transmitter and the receiver, and $V_m$ is the acoustic velocity in the borehole fluid between the transmitter and the receiver. $V_m$ will typically be approximately 5,000 feet per second where the borehole fluid is drilling mud.

In such preferred embodiment, each travel time line along which stacking is performed is chosen so as to include an apparent shot point, which apparent shot point is related to a particular velocity (i.e., the slope of the travel time line) by equation (2). FIG. 3 shows three such travel time lines.

It should be recognized that the Stoneley wave arrival, which is not a refracted arrival to which Snell's law applies, is treated specially in equation (2), as in equation (1). Along with the other modal arrivals, the Stoneley arrival appears to emanate from the actual transmitter location (location C in FIG. 3). To account for this property, in the preferred embodiment, the apparent transmitter location is taken to be the actual transmitter location for velocities less than $V_m$, the acoustic velocity in the borehole fluid.

In an alternate embodiment, each travel time line along which stacking is performed extends through a common apparent shot point, such as apparent shot point A in FIG. 3. The common shot point may be determined by identifying an acoustic arrival via any conventional technique. Such alternate embodiment will be particularly useful in applications in which it is accurate to assume that the position of the apparent shot point (computed in accordance with equation (2)) will vary only slightly (or not at all) with velocity, so that it is approximately correct to stack along travel time lines extending through a common apparent shot point.

Figure 4:
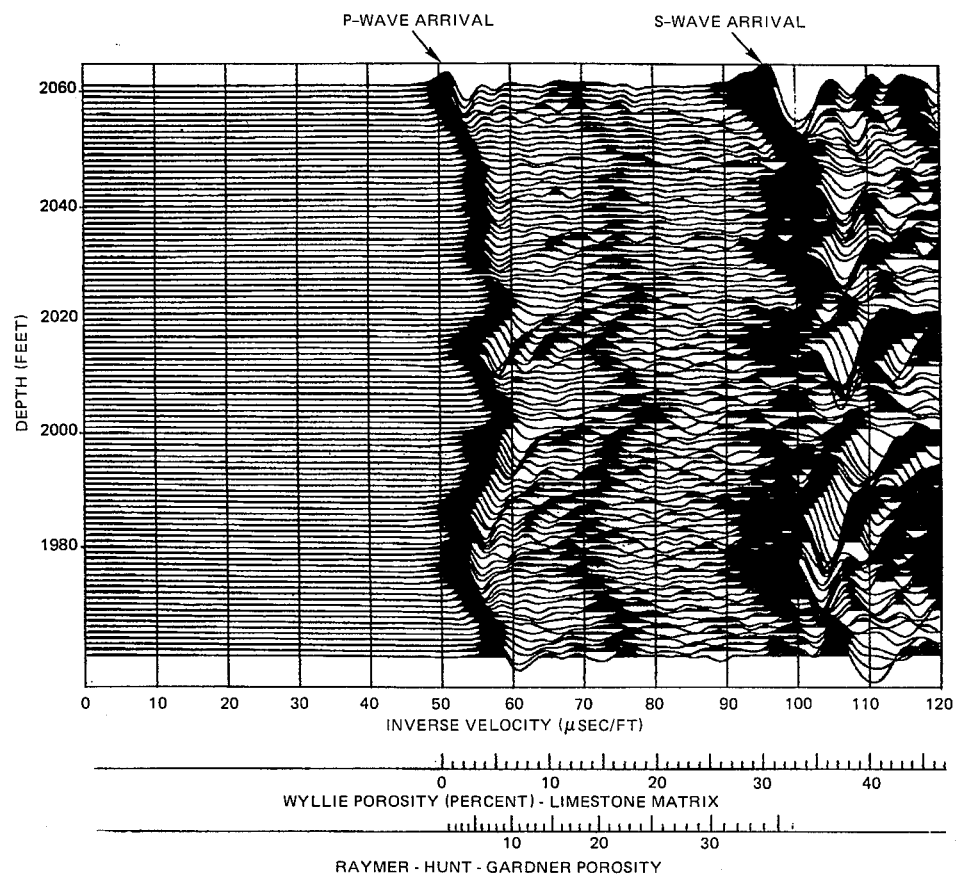
FIG. 4 is display of stacked signals produced in accordance with the method of the invention, each stacked signal representing the acoustic information received at at least two receivers in a multiple receiver acoustic logging system as the result of a single emission of an acoustic pulse from a transmitter. Each stacked signal represents received acoustic amplitude plotted versus inverse acoustic velocity (in units of microseconds per foot). Two alternative porosity scales are also shown to illustrate that the stacked signals may alternatively be plotted versus porosity, instead of versus inverse velocity.

FIG. 4 is an example of a display of acoustic logging data from a limestone reservoir produced as the result of performing the method of the invention in the preferred embodiment thereof described above. Each generally horizontal trace of FIG. 4 is a stacked signal (also referred to herein as a "travel time stack") representing information received at two or more acoustic receivers in a multi-receiver acoustic logging tool following emission of an acoustic pulse by an acoustic transmitter in the tool. Each stacked signal has an amplitude representing the sum of amplitudes of each of a plurality of individual receiver signals along a travel time line, for each of a range of inverse velocities (in units of microseconds per foot). Two alternative scales, with respect to which the stacked signals may be displayed, are also shown in FIG. 4. Those two scales will be discussed below.

The P wave arrival and the S wave arrival are indicated on FIG. 4. The corresponding P wave inverse velocity and S wave inverse velocity may be read from each stacked signal of the display by an analyst. Each stacked signal is thus indicative of an acoustic velocity for each identifiable acoustic wave arrival, which velocity is a quantity averaged over the region along the borehole axis spanned by the transmitter and the individual receivers. Accordingly, the resolution realizable in the direction of the borehole axis in this preferred embodiment may typically be on the order of 10 feet, where the transmitter and receivers are spread along the borehole axis over an interval of on the order of 10 feet. Another preferred embodiment resulting in increased resolution will be discussed below with reference to FIGS. 5, 6, and 7.

It is important to understand that the P wave and S wave arrivals indicated on FIG. 4 correspond to amplitude maxima in each travel time stack. This comes about because of the way in which the apparent shot point for each velocity was chosen. In this set of stacks, the apparent shot points were selected so that the travel time lines passed through peaks in the P and S wave arrivals. Thus, it is the peaks which reinforce each other, and we interpret peaks in the stack as the inverse velocities of refracted wave arrivals. The final point to make about FIG. 4 is that we have not discarded any of the original data. A log analyst must make an interpretation of the P and S wave inverse velocities from the display; they have not been directly supplied by a computer program. By the same token, it is immediately clear that many of the maxima in FIG. 4 do not correspond to a refracted arrival.

It will be apparent that, alternatively, amplitude minima in each travel time stack may be interpreted as the inverse velocities of acoustic wave arrivals. In this case, the apparent shot points are chosen differently (so that the travel time lines pass through troughs in the P and S wave arrivals) than in the case discussed in the previous paragraph, or the amplitudes of the travel time stacks are multiplied by the quantity negative one ($-1$) at an appropriate stage of processing.

Although no Stoneley wave arrival is indicated on FIG. 4, it should be understood that the Stoneley wave arrival would have substantially the same appearance as the P wave arrival and S wave arrival indicated on FIG. 4, though, in general, it would be associated with a different (larger) inverse velocity than the P wave and S wave arrivals. The preceding discussion of the P wave and S wave arrivals of FIG. 4 applies equally well to the Stoneley wave arrival.

It should be recognized that the method of the invention may be employed to produce a display similar to that shown in FIG. 4, by processing data from an acoustic logging tool having any number of transmitters and receivers. In the case that the tool has one receiver (or the tool has several receivers, but only one receiver is monitored for each transmitter firing) and several transmitters, individual receiver signals associated with substantially the same receiver position, but with different shots may be processed in the manner described above. The travel time lines along which stacking is performed may be visualized in this case as lines through the apparent receiver position (for each velocity) relative to the shot positions, each having a slope equal to a possible acoustic velocity. Each travel time stack thus produced will have an amplitude, for each possible velocity, substantially equal to the sum of the amplitudes of the individual receiver signals (each associated with different shot point) along a travel time line corresponding to the associated velocity. Each such travel time stack will be indicative of velocity averaged over the depth interval, along the borehole axis, spanned by the single receiver position and the relevant set of shot points.

To compensate for the well known phenomenon of geometric falloff (i.e. the phenomenon that the amplitude of certain types of acoustic waves will attenuate increasingly with increasing propagation distance), it is sometimes desirable to apply more gain to the signals received at receivers farther from the transmitter than to the signals received at receivers nearer to the transmitter, prior to stacking portions of such signals along travel time lines in accordance with the method of the invention. Such gain adjustment will enhance cancellation of peaks and troughs during stacking along travel time lines whose slope is not equal to the velocity of an acoustic arrival at the receivers.

However, the geometric falloff rate for P waves differs from that for S waves, and both of these falloff rates differ from the falloff rate for Stoneley waves. If it is desired to extract P wave velocity information from the display produced in accordance with the invention, it is desirable to compensate for P wave geometric falloff by multiplying each raw received signal, prior to stacking along travel time lines, by the actual distance between the transmitter and the receiver associated with the signal. Alternatively, in order to compensate for S wave geometric falloff (and preferentially to extract S wave velocity information from the display), it is desirable to multiply each raw received signal, prior to stacking along travel time lines, by the quantity $(d)^2$, where d is the actual distance between the transmitter and the receiver associated with the signal.

The Stoneley wave is a special case. This low frequency guided wave travels at a slow, nearly constant speed and attenuates extremely slowly with distance. If it is desired to extract Stoneley wave information from the display of the present invention, it is preferable to forego any gain adjustment.

The velocity dependence of the apparent transmitter-to-source distance is neglected in one embodiment of the method described above, so that in such embodiment the apparent shot point is identified for a particular acoustic arrival (having a particular velocity), and the apparent distance between the transmitter and any one of the receivers is taken to be the sum of the distance between the apparent shot point and the receiver nearest the transmitter, and the actual distance between said any one of the receivers and the receiver nearest the transmitter. Alternatively, in another embodiment described above, the velocity dependence of the apparent transmitter-to-receiver distance is accounted for.

In an alternate preferred embodiment of the method of the invention, improved resolution in the direction of the borehole axis is obtained by performing the procedure to be described below with reference to FIGS. 5 and 6. Such description of the procedure will assume that the logging is performed using a tool having one transmitter and three or more receivers which are evenly spaced from each other. It will be apparent that the description applies also to the case where the data to be processed is obtained by using a tool having at least two transmitters, or a tool having unevenly spaced receivers, or to a tool having a single receiver or two receivers. The procedure differs slightly depending on whether the shot spacing employed is equal to the inter-receiver spacing or is not equal to the inter-receiver spacing. The former case will be discussed first.

In the embodiments of the method described above, individual receiver traces associated with a common shot are added along travel time lines emanating from the apparent shot point, which apparent shot point (in the preferred embodiments) "slides" as the velocity changes. The procedure also works where one produces a stack using only two individual receiver signals to form the sum. A stack containing information from only two receivers should clearly be assigned to the depth interval spanned by those receivers. If the tool has more than two receivers and the transmitter is fired at positions separated by distance intervals equal to the inter-receiver spacing, there will be other pairs of individual receiver signals which span the same depth interval, but which come from different shot points. For a twelve receiver tool of the type schematically shown in FIG. 5 with shot spacing equal to the receiver spacing, there are eleven such pairs which cover a common depth interval. Of course, each pair will be treated slightly differently (where the velocity dependence of the apparent transmitter-to-receiver distance is accounted for) since each has a different apparent source location, but the pairwise stacks may themselves be summed to give common depth travel time stacks.

For example, depth interval A in FIG. 5 is spanned by pair of receivers $D_1$ and $D_2$ when the tool is in position I in the borehole. Assuming that transmitter T and receivers $D_1$ through $D_{12}$ (only receivers $D_1$, $D_2$, $D_3$, $D_4$, $D_{10}$, $D_{11}$, and $D_{12}$ are shown in FIG. 5) are held fixed relative to each other, if the tool is moved upward in the borehole by a distance equal to the inter-receiver spacing, d, to position II, then depth interval A in the borehole will be spanned by pair of receivers $D_2$ and $D_3$. Similarly, the same depth interval A will be spanned respectively, by receiver pairs $D_3$ and $D_4$, $D_4$ and $D_5$, $D_5$ and $D_6$, $D_6$ and $D_7$ $D_7$ and $D_8$, $D_8$ and $D_9$, $D_9$ and $D_{10}$, $D_{10}$ and $D_{11}$, and $D_{11}$ and $D_{12}$ as the tool is moved up the borehole by consecutive distance increments d. By firing the transmitter at each of the twelve positions, individual receiver signals will be obtained from which eleven pairwise stacked signals (pairwise travel time stacks) associated with depth interval A may be produced. These eleven pairwise stacked signals are added together, and the resulting sum of pairwise stacked signals (referred to herein as a "common depth travel time stack") is displayed. Similarly, the pairwise travel time stacks for each other depth interval spanned by a pair of receivers are added together, and the resulting sums of pairwise travel time stacks are displayed.

Figure 6:
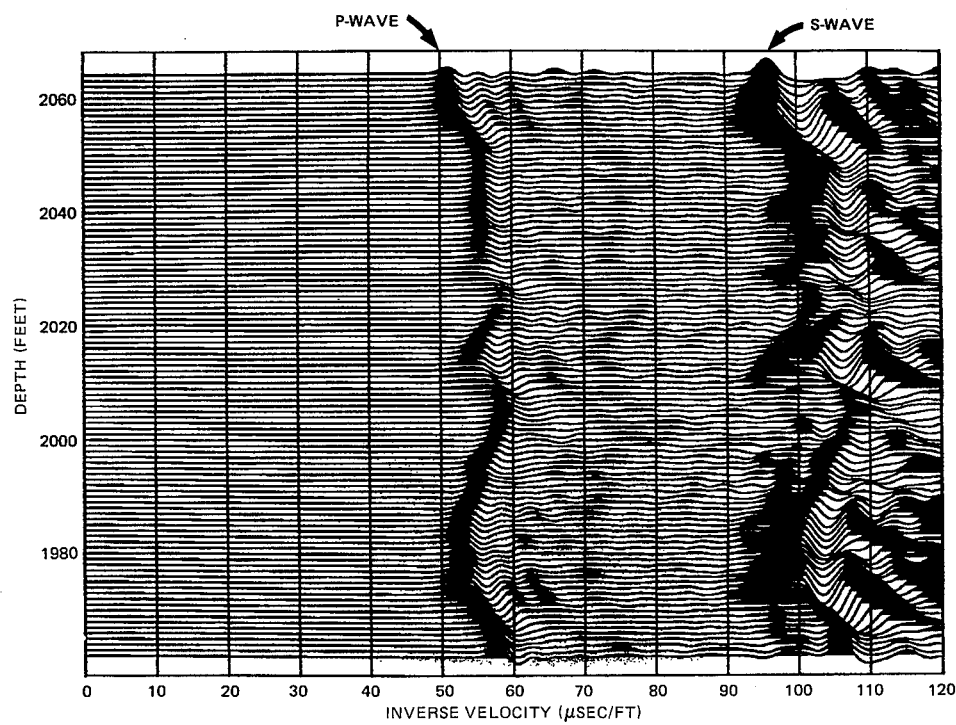
FIG. 6 is a display of stacked signals produced in accordance with the method of the invention, each stacked signal representing the acoustic information received at pairs of adjacent receivers spanning a common depth interval along the borehole axis. Each stacked signal represents received acoustic amplitude associated with a particular depth interval, plotted as a function of inverse acoustic velocity (in units of microseconds per foot).

In FIG. 6, we show the common depth travel time stacks for the same borehole interval represented by the displayed signals shown in FIG. 4. The P wave and S wave arrivals are indicated on FIG. 6. It is apparent that the vertical resolution of the displayed data of FIG. 6 has been improved over that of FIG. 4 by comparing both the definition and the vertical continuity of the S wave arrival at a depth of about 2,030 feet and again at about 2,010 feet. The degree of cancellation has also been improved in the interval between 60 and 80 microseconds per foot. Whereas twelve individual receiver traces (one for each receiver) contribute to each of the common source travel time stacks in FIG. 4, twenty-two individual receiver traces contribute to each of the common depth travel time stacks of FIG. 6. The extra multiplicity comes about because most of the individual receiver signals contribute to the depth intervals both above and below their receivers.

If the shot spacing is less than the distance between receivers (still assuming that the receivers are evenly spaced from each other), the formation is clearly sampled at a finer vertical resolution. It is desirable to extract from such a data set the data that would have been measured had the receivers been more closely spaced.

Figure 7:
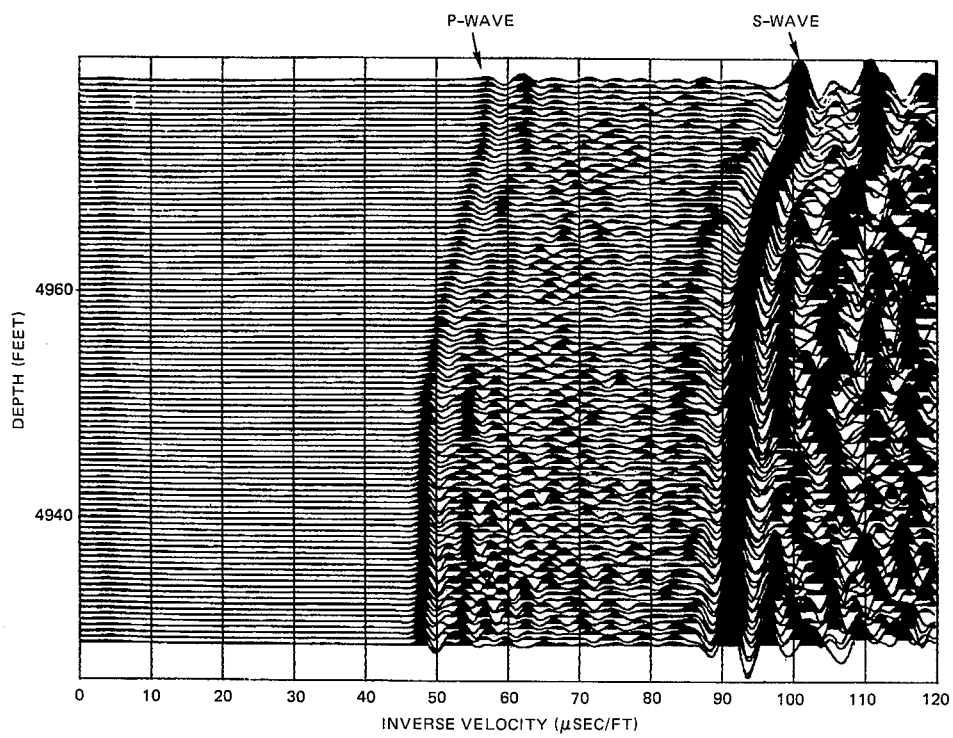
FIG. 7 is a display of stacked signals produced in accordance with a variation on the inventive method resulting in the display of FIG. 6, in which variation the common depth intervals overlap each other.

To attain this result, the following approach may be adopted. One fires the source at even subintervals of the receiver spacing, for example 1/nth foot where the receivers are spaced at intervals of one foot. The entire data set may then be broken into n data sets, each with the shot spacing equal to the receiver spacing. Each of these n data sets can be stacked in the common depth point fashion described above. Finally, the resulting stacks are plotted at the depth interval (of length one foot) where they occur, thereby merging the n data sets back together. FIG. 7 shows common depth travel time stacks produced in this manner from acoustic logging data from a limestone formation, with a shot interval of one half foot. The display of FIG. 7 resolves the formation at a scale below one foot, without showing the artifacts which would have resulted had conventional filtering schemes for extracting more finely resolved velocity information from coarser velocity information measured on overlapping depth intervals, been employed.

Although the above methods for producing a display of common depth point travel time stacks have been described in the embodiment where the receivers of the logging system are evenly spaced from each other, it is within the scope of the invention to perform such methods where the inter-receiver spacing is uneven. In such alternative embodiment, only those travel time stacks for adjacent pairs of receivers which are associated with substantially the same depth interval are summed together.

Similarly, it is within the scope of the invention to produce displays of travel time stacks (or common depth travel time stacks) from data received during operation of multiple-transmitter acoustic logging systems having any number of receivers. In such alternative embodiments, the transmitters are sequentially fired, and an acoustic signal, associated with each acoustic signal emitted from a single one of the transmitters, is received at each receiver. The transmitters (each of which may be located at a different position along the borehole axis) may be sequentially fired while the receivers (or receiver) remain fixed, or the receivers (or receiver) may be moved along the borehole axis between individual firings of the transmitters. Where more than one receiver is employed, the method of the invention may be performed on each set of received signals associated with a common shot point to generate a travel time stack. Where only one receiver is employed, the method of the invention may be performed on selected sets of received signals each associated with a common receiver position to generate a travel time stack indicative of acoustic velocity averaged over the region along the borehole axis spanned by the receiver position and the individual shot points. Alternatively, pairs of such received signals associated with a common receiver may be processed in accordance with the method of the invention to generate pairwise travel time stacks, each associated with a depth interval spanned by a pair of shot points.

In yet another variation in which a single receiver is employed, the transmitter or transmitters may be so positioned, and the receiver moved between shots to such locations, that signals associated with a common shot point are received at the receiver at each of several receiver positions. Such received signals associated with a common shot point may be processed in accordance with the method of the invention to produce a travel time stack. Alternatively, pairs of such received signals associated with the common shot point may be processed in accordance with the invention to produce pairwise travel time stacks, which may be, in turn, stacked to generate a common depth travel time stack. Variations on the embodiments described in this paragraph, and the immediately preceding paragraph, will be apparent to those ordinarily skilled in the field of the invention.

In a variation on any of the embodiments of the method of the invention described above, the travel time stacks (or common depth travel time stacks) may be displayed not directly as a function of inverse velocity, but instead as a function of a quantity related to velocity. For example, by exploiting empirical one-to-one relationships between acoustic velocity and formation porosity, one may change the scale of the display of the invention to porosity units. FIG. 4, described above, shows travel time stacks produced according to the invention, which are plotted as a function not only of inverse acoustic velocity, but also as a function of formation porosity. The two porosity scales and the inverse velocity scale shown in FIG. 4 may be employed interchangeably. The upper porosity scale in FIG. 4 was generated by computing formation porosity values from acoustic velocity in accordance with Wyllies' relationship with the assumption that the formation logged is limestone. The lower porosity was generated by computing formation porosity values from acoustic velocity in accordance with the Raymer-Hunt-Gardner transformation. See L.L. Raymer, et al., "An Improved Transit Time-to-Porosity Transform", Twenty-first Annual Symposium, Society of Professional Well Log Analysts, Lafayette, La. (1980) for a discussion of the Raymer-Hunt-Gardner transformation. See R. E. Sheriff, *Encyclopedic Dictionary of Exploration Geophysics* (The Society of Exploration Geophysicists, Tulsa 1973) for a discussion of Wyllies' relationship. An analyst may directly interpret one of the acoustic arrivals as the formation porosity in this variation of the display of the invention.

Figure 8:
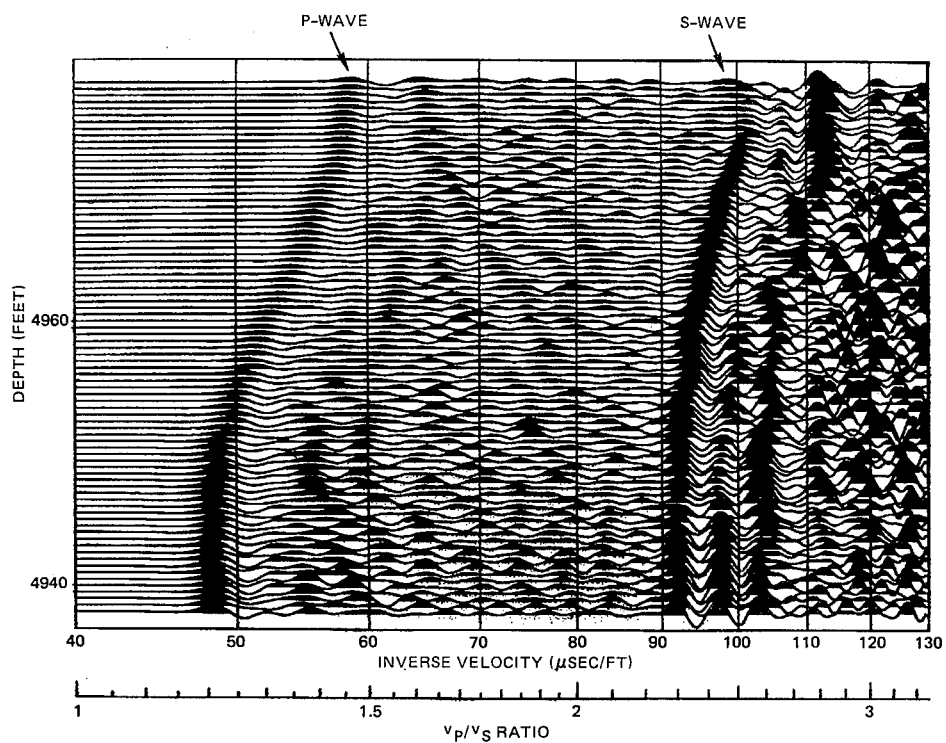
FIG. 8 is a display of stacked signals produced in accordance with the method of the invention and plotted on a logarithmic inverse velocity scale. Also shown in FIG. 8 is a logarithmic overlay scale for use with the display for the purpose of extracting directly therefrom information regarding the P wave velocity ($V_p$) to S wave velocity ($V_s$) ratio associated with each stacked signal of the display.

In other variations, the travel time stacks may be displayed on non-linear scales, such as logarithmic scales. For example, FIG. 8 represents a display of travel time stacks plotted on a logarithmic scale. The horizontal distance on FIG. 8 between the inverse velocities of the S wave and P wave arrivals is log $(1/V_s) - \log (1/V_p) = \log (V_p/V_s)$, where $V_s$ is the S wave velocity and $V_p$ is the P wave velocity. FIG. 8 also shows an overlay logarithmic scale (marked in units of log $(V_p/V_s)$, which may be employed by an analyst to read off directly from each travel time stack the corresponding value of log $(V_p/V_s)$. The correlation of the ratio $V_p/V_s$ to lithology is well known (see, for example, J. F. Nations, "Lithology and Porosity from Acoustic Shear and Compressional Wave Transit Time Relationships," The Log Analyst, Vol. XV, No. 6, p. 3 (Nov.–Dec. 1974)). The overlay scale of FIG. 8 will be recognized to be identical to the portion (not shown) near the origin of the scale directly above it in FIG. 8. Accordingly, it will be recognized that a separate overlay scale need not be employed to facilitate direct reading of values of log $(V_p/V_s)$ from the display, but that rather, such values could be read from the complete upper scale itself (only a portion of which upper scale is shown in FIG. 8).

In another variation on the embodiment described above, in which the travel time stacks are displayed on logarithmic scales, one may employ overlay scales to extract horizontal and vertical stress information directly from the travel time stacks. To do this, one first recalls that $P_H = (1 - 2(V_s/V_p)^2)P_v + P_{t\,e} + P_{t\,h}$ where $P_H$ is the horizontal stress on a portion of earth formation, $P_v$ is the vertical stress on the portion, $V_s$ is the S wave velocity in the portion, $V_p$ is the P wave velocity in the portion, $P_t$ $_e$ is the tectonic stress on the portion, and $P_{t\,h}$ is the thermal stress. By ignoring the tectonic stress and thermal stress terms, one obtains the approximate expression $P_H/P_v = 1 - 2(V_s/V_p)^2$. The quantity $(V_s/V_p)^2$ is determined by directly reading, in the manner described in the preceding paragraph, the quantity log $(V_p/V_s)$ from the travel time stacks. It will be recognized that a suitable overlay scale may be designed and employed to permit one to read off directly from each travel time stack the associated value of the $P_H/P_V$ ratio. The $P_H/P_V$ ratio is useful for planning hydraulic fracturing or waterflooding operations since the ratio $P_H/P_V$ controls the shape and size of fractures produced during such operations.

In yet another variation on the display of the invention, the travel time stacks (or common depth travel time stacks) are plotted on a logarithmic scale of porosities (similar to the linear scales of porosities shown in FIG. 4) and overlay scales are employed in the following manner to permit direct extraction of information regarding formation water saturation from the display. Archie's formulae (see R. E. Sheriff, *Encyclopedic Dictionary of Exoloration Geophysics* (The Society of Exploration Geophysicists, Tulsa 1973), express $S_W$, the water saturation, as $S_W = ((R_W/R_t)(a/\phi^m))^{1/n}$, where $\phi$ is the porosity, a, m, and n are experimentally determined constants, $R_w$ is the resistivity of the formation water, and $R_t$ is the resistivity of the formation when 100% saturated with formation water. It follows that $$\log (S_w) = \frac{1}{n} (\log (R_w/R_t)) + \frac{1}{n} (\log (a)) - \frac{m}{n} \log (\phi)).$$

The ratio $R_w/R_t$ may be obtained from independent induction logging measurements and resistivity measurements on the borehole fluid (or from local geological knowledge). As with the $V_P/V_s$ ratio discussed in the previous paragraph, log $(R_W/R_t)$ is measured (such as from an induction log scale) and is transferred to another logarithmic scale (which shall be referred to hereinafter as "scale A") and which is the same as the induction log scale stretched (or "magnified") by the factor n. The travel time stacks are plotted on a logarithmic scale of porosities, which logarithmic scale is the same as the induction log scale compressed by the factor m. A distance on the travel time stack display representing porosity is subtracted from the distance already marked on scale A. The resulting position on scale A represents a direct measure of the formation water saturation.

Other variations on the display of the invention and techniques for extracting information therefrom will be apparent, in view of the foregoing, to those of ordinary skill in the art. For example, if the Stoneley wave frequency is sufficiently low, the shear wave velocity, $V_s$, is related to the Stoneley wave velocity, $V_{S\,T}$, by $V_s = V_m ((\rho_2/\rho_1) (V_m^2/V_{S\,T}^2) - 1))^{-\frac{1}{2}}$, where $V_m$ is the speed of sound in the borehole fluid, $\rho_2$ is the formation density, and $\rho_1$ is the borehole fluid density. Accordingly, the travel time stack display can be plotted on a logarithmic scale (as discussed above with reference to the $V_p/V_s$ ratio) and a logarithmic scale overlay (for each value of $\rho_2/\rho_1$), marked to permit direct reading of the shear wave velocity, $V_s$, from measurements of the ratio $V_m/V_{S\,T}$, may be employed. This technique is particularly useful for obtaining $V_s$ in the case that a monopole logging tool is employed and $V_s < V_m$, since in such case there will be no shear wave arrival at the receivers. For another example, in processing acoustic logging data from cased boreholes, the amplitude of each displayed travel time stack may be correlated with the quality of the cement bond between the casing and the formation by exploiting the phenomenon that where the cement bond is strong, much acoustic energy will propagate into the formation (so that little refracted P wave and S wave acoustic energy will be received at the receivers) and where the bond is weak, strong refracted wave (P wave and S wave) arrivals will be detected at the receivers.

Preferably, the foregoing methods are implemented by digitizing the individual receiver signals, then processing the digitized signals, then converting the processed digitized signals to analog form, and finally displaying the analog stacked signal. To accomplish this, the processing steps described above may be translated into a series of computer instructions in a manner that will be apparent to those ordinarily skilled in the art of computer programming. Alternatively, the digitized signals are processed in hardwired circuitry, in a manner to be described below in detail. In another variation, the foregoing methods may be implemented by processing the individual receiver signals in analog form in hardwired circuitry, in a manner also to be described below.

The foregoing methods may be performed using hardwired digital circuitry in the following manner. Each of the individual receiver signals is digitized at a sample rate approximately proportional to the apparent distance of the associated receiver from the transmitter. In other words, $S_1/S_2$ is approximately equal to $D_1/D_2$, where $S_1$ and $S_2$ are the sample rates, respectively, at which signals are digitized which are received at receivers positioned at a first apparent distance $D_1$, and a second apparent distance $D_2$ away from the transmitter. In a preferred variation in this embodiment, the sample rates are chosen on the assumption that the apparent shot point may be approximated to be independent of velocity, so that it is approximately correct to stack along travel time lines extending through a common apparent shot point. Accordingly, in such preferred variation, the apparent distance, $D_0$, between the transmitter and the receiver nearest thereto is identified. Assuming all receivers are located on the same side of the transmitter (along the borehole axis), the sample rates $S_1$ and $S_2$, respectively, for signals received at receivers located, respectively, an actual distance $D_1$ and $D_2$ away from the receiver nearest the transmitter satisfy approximately the relation $S_1/S_2 = (D_0 + D_1)/(D_0 + D_2)$. More generally, whether the transmitter is located between the receivers or in the same direction with respect to all of the receivers (along the borehole axis), the respective signals from a first receiver located a first actual distance $d_1$ in the direction opposite the transmitter from the point located between the transmitter and the first receiver at a distance $d_A$ (where $d_A$ is the actual distance between the transmitter and the receiver nearest thereto) away from the transmitter, and from a second receiver located a second actual distance $d_2$ in the direction opposite the transmitter from the point located between the transmitter and the second receiver at a distance $d_A$ away from the transmitter, are digitized at sample rates satisfying approximately the relation $S_1/S_2 = (D_0 + D_1)/(D_0 + D_2)$.

The digitized signals are stored in storage locations identifiable by row and column indices, such that consecutive digitized points of each digitized signal are stored in locations having consecutive column indices, and digitized signals associated with adjacent receivers are stored in locations having consecutive row indices. Sums of the digitized signals are next formed by adding digitized points identifiable by a common column index. It will be recalled that each such sum is associated with a velocity. The summed (or "stacked") digitized signal comprised of the sums is converted to analog form and displayed.

The hardwired embodiment of the invention is described in the following example. In the example, the apparent distance $D_0$ between the transmitter and the receiver nearest thereto is 7.9 feet, the raw data is obtained using the tool shown in FIG. 2 with the receivers spaced from each other by one foot intervals, and the most distant receiver (receiver 18 in the system shown in FIG. 2) is digitized at 4 $\mu$sec intervals. The signal from the nearest receiver (receiver 7 in the system shown in FIG. 2) is digitized at intervals of $(4)(7.9)/(7.9+11) = 1.67$ $\mu$sec. The signal from receiver 8 (of FIG. 2) is digitized at intervals of $(4)(8.9)/(7.9+11) = 1.88$ $\mu$sec, the signal from receiver 9 (of FIG. 2) is digitized at $(4)(9.9)/(7.9+11) = 2.10$ $\mu$sec intervals, and so on. For each individual receiver signal, 4000 digitized points are retained to form the digitized wavetrain. Viewed in their memory locations, the wavetrains appear stretched by amounts related to the apparent distance of their respective associated receivers from the transmitter. A hardwire addition circuit now performs the travel time stack in a trivial fashion by simply sweeping linearly across the memory locations forming the sum of all of the first points, all of the second points and so on. To decrease the processing time involved, more addition circuits could be employed, each assigned to only a portion of the memory locations.

The procedure to compensate for geometric falloff involves weighting the stored points, in the same manner as discussed above, prior to or during the addition process. For example, for P waves, a desirable weighting multiplier is the actual distance between the transmitter and the relevant receiver. Suppose the distance is in feet and that we wish to maintain accuracy to 0.1 foot. In that case, $(10)D_0$ is an integer. Since hardwire multiplication of integers is simply bit shifting followed by additions, it is straightforward to build this into the circuitry which performs the stack. The multipliers themselves are known at the same time the apparent distance is determined and the digitizing rates set. Alternatively, a conventional borehole compensated logging tool could be used to update the apparent distance prior to each shot.

Because the apparent shot point location, as well as the geometric falloff rate, differs for each of the various possible types of acoustic arrivals, two separate portions of the hardwired device would be needed to produce both falloff-compensated stacked signals from which P wave velocity information may be extracted and from which S wave velocity information may be extracted. The raw individual receiver signals would be split, in this embodiment, and input into both portions of hardware. One portion would digitize the signals assuming the "P wave" apparent shot point, and would compensate for geometric falloff assuming the P wave falloff rate; the other would digitize the signals assuming the "S wave" apparent shot point, and would compensate for geometric falloff assuming the S wave falloff rate. Geometric falloff compensation would preferably not be performed when stacked signals are generated from which Stoneley wave velocity information is desired to be extracted.

Additional logic is required to implement the embodiment of the method described above which results in common depth travel time stacks, having relatively high vertical resolution. As described above, for a given shot location one forms the pairwise travel time stacks of adjacent receivers. For a tool with $N+1$ receivers and a shot spacing equal to the receiver spacing, there are N such pairs which cover a common depth interval. Enough storage locations must be available to hold N travel time stacks. Initially, the storage locations are filled with zeroes. In the first step, the N pairwise stacks associated with the first shot are entered into storage. For simplicity, for purposes of the following description we shall assume that the tool is being pulled uphole during logging, although this embodiment of the method may also be performed in the case that the tool is lowered downhole during logging. The pairwise travel time stacks are stored so that the stacks associated with adjacent pairs of receivers are stored in adjacent rows with the adjacent stack associated with the receiver pair located higher in the borehole being stored in the row having higher row index, and so that consecutive digitized points of each pairwise travel time stack are stored in adjacent columns. In the second step, the contents of the row having the lowest index are output as the common depth travel time stack associated with that depth. In the third step, the contents of the uppermost $N-1$ rows are each shifted down one row location. The entire procedure then repeats from the first step within the N pairwise time stacks associated with the second shot being entered into storage in the same locations as were the corresponding points in the first step.

As in the software embodiment, one still further can improve the vertical resolution by firing the transmitter at positions separated by intervals less than the inter-receiver distance. To carry out this improvement in the hardwired implementation, one fires the transmitter at even subintervals of the receiver spacing of, for example, 1/Mth foot. It is necessary to provide storage locations for $N \times M$ travel time stacks. For convenience, we view these storage locations as being on the surface of a cylinder, with N rows extending in the direction perpendicular to the axis of the cylinders and $P \times M$ columns extending in the direction parallel to the axis of the cylinder, where P is the number of digitized points in each stack. Each row contains M stacks obtained as the result of M consecutive firings of the transmitter, with the associated shot points being clustered along the borehole axis within a depth interval of length equal to the inter-receiver spacing. The first P locations in any row store the stack associated with the pair of receivers located lowest in the borehole. The hardware carries out the first three steps of the common depth procedure described above, in the first P columns of the memory unit. Then a fourth step is performed prior to the next shot. The fourth step is to shift each data point to another location in the same row having column index greater by the quantity P than its then current column index. The four steps are then repeated, again in the first P columns. After M repetitions of this set of four steps, the data from the "M+1"th shot is added into the first P columns, which will contain data from the first shot. The contents of the first P columns of the bottom row are output during each repetition, and displayed.

It will be apparent that instead of shifting the data between memory locations as described in the foregoing paragraph, in an alternative embodiment, the hardware could shift to the appropriate locations to perform the described operations.

It should be recognized that throughout this specification, including the claims, all references to consecutively increasing row indices (or column indices) are equivalent to consecutively decreasing row indices (or column indices). Any one of a plurality of sets of increasing or decreasing row (or column) indices may be arbitrarily assigned to the storage locations of the memory unit employed. The row and column indices may, of course, be arbitrarily assigned independently of whether the tool is raised uphole during logging, or lowered downhole during logging. "Up" (or "down") in the memory unit need not correspond with "up" (or "down") in the borehole, but once one associates a higher (or lower) position in the borehole with an increased (or decreased) row (or column) index, then the direction of "motion" in memory depends on the direction of motion in the borehole.

Alternatively, the hardwired implementation of the invention may be performed by analog circuitry. In this alternate embodiment, the individual receiver signals are processed in analog form, and the resulting travel time stack (or common depth travel time stack) is displayed.

The above description is merely illustrative of the invention. Various changes in shapes, sizes, materials or other details of the methods and constructions described may be made within the scope of the appended claims without departing from the spirit of the invention.

What is claimed is:

1. A method of producing a display of signals received during operation, in a borehole having an axis and containing fluid, of an acoustic logging system having at least one acoustic transmitter and at least two acoustic receivers spaced a fixed distance from each other along the direction of the borehole axis, including the steps of:

(a) receiving at least two acoustic signals, both signals resulting from operation of a first transmitter;

(b) determining the apparent distance, D, between the first transmitter and the receiver nearest the first transmitter, where $D_A$ is the actual distance between the first transmitter and said nearest receiver;

(c) digitizing the received signals, each at a sample rate selected so that the ratio, $S_1/S_2$, where $S_1$ is the sample rate at which signals received by a first receiver positioned at a first actual distance, $D_1$, in the direction opposite from the first transmitter away from the point located between said first receiver and the first transmitter at a distance $D_A$ from the first transmitter are digitized, and $S_2$ is the sample rate at which signals received by a second receiver positioned at a second actual distance, $D_2$, in the direction opposite from the first transmitter away from the point located between said second receiver and first transmitter at a distance $D_A$ from the first transmitter are digitized, is substantially equal to the ratio $(D+D_1)/(D+D_2)$;

(d) storing the digitized signals in a storage unit having an array of memory locations identifiable by row and column indices, such that digital signals associated with adjacent receivers are stored in adjacent rows, and consecutive digitized points of each digitized signal are stored in adjacent columns;

(e) generating a digitized summed signal consisting of a digitized point for each of a plurality of possible velocities of acoustic wave arrivals at the receivers, the magnitude of each such digitized point of the summed digitized signal being equal to the sum of all values of digitized points stored in one of the columns of the storage unit;

(f) producing an analog summed signal by converting the digitized summed signal to analog form; and (g) displaying the analog summed signal.

2. The method of claim 1, also including the step of:

(h) weighting each of the digitized points of the received signals prior to completion of step (e) to compensate for increased attenuation of the received signals with increased transmitter to receiver distance.

3. A method of displaying acoustic well logging signals received during operations, in a borehole having a longitudinal axis and containing fluid, of a logging system having at least one acoustic receiver, including the steps of:

(a) identifying an acoustic wave arrival from the received acoustic well logging signals;

(b) generating a stacked signal having amplitude at any point substantially equal to the sum of the amplitudes of at least two of the received signal taken along a travel time line, where each travel time line is associated with a common apparent distance between the transmitter and receiver of the associated transmitter-receiver pair which spans the smallest actual distance along the longitudinal axis, and where the stacked signal is generated by digitizing each of the received signals at a sample rate selected so that the ratio, $S_1/S_2$, of the sample rates, $S_1$ and $S_2$, respectively, at which signals associated with receiver positions at a first apparent distance, $D_1$, and a second apparent distance, $D_2$, away from their respective associated shot points are digitized is approximately equal to $D_1/D_2$; storing the digitized signals in storage locations identifiable by row and column indices, such that consecutive digitized points of each digitized signal are stored in locations having consecutive column indices, and digitized signals associated with adjacent receivers are stored in locations having consecutive row indices; forming sums of digitized points from each of the digitized signals, each said sum being made over one selected digitized point from each of the digitized signals, said selected digitized points being those encountered during a possible linear sweep across the rows and columns of the storage locations;

(c) converting the stacked signal, comprising the formed sums of digitized points, into analog form; and then (d) displaying the stacked signal.

4. A method of displaying acoustic well logging signals received during operations, in a borehole having a longitudinal axis and containing fluid, of a logging system having at least two receivers, including the steps of:

(a) identifying an acoustic wave arrival from the acoustic well logging signals;

(b) generating a stacked signal having amplitude at any point substantially equal to the sum of the amplitudes of at least two of the received signals taken along a travel time line, where each of the at least two received signals results from transmission of an acoustic signal from a first transmitter, each of the travel time lines is associated with a common apparent distance between the first transmitter and the receiver nearest the first transmitter which common apparent distance is determined from the acoustic arrival identified in step (a), and wherein the stacked signal is generated by digitizing each of the received signals at a sample rate selected so that the ratio, $S_1/S_2$, of the sample rates, $S_1$ and $S_2$, respectively, at which signals associated with received positions at a first apparent distance, $D_1$, and a second apparent distance, $D_2$, and away from their respective associated shot points are digitized is approximately equal to $D_1/D_2$; storing the digitized signals in storage locations identifiable by row and column indices, such that consecutive digitized points of each digitized signal are stored in locations having consecutive column indices, and digitized signals associated with adjacent receivers are stored in locations having consecutive row indices; forming sums of digitized points from each of the digitized signals, each said sum being made over one selected digitized point from each of the digitized signals, said selected digitized points being those encountered during a possible linear sweep across the rows and columns of the storage locations;

(c) converting the stacked signal, comprising the formed sums of digitized points, into analog form; and then (d) displaying the stacked signal.

5. A method of displaying acoustic well logging signals received during operations in a borehole containing fluid of a logging system having at least one acoustic transmitter and at least one acoustic receiver, including the steps of:

(a) identifying an acoustic wave arrival from the received signals;

(b) determining, for each of a plurality of possible velocities associated with a possible acoustic wave arrival at any one receiver, the corresponding apparent distance between said any one receiver and the transmitter from which the acoustic wave arrival originated, thus determining a plurality of travel time lines for the logging system, each travel time line associated with a possible velocity;

(c) generating a stacked signal, said stacked signal having a particular amplitude associated with each of a plurality of possible velocities, each said amplitude being substantially equal to the sum of the amplitudes of the received signals taken along the travel time line corresponding to the associated velocity; and (d) displaying the stacked signal.

6. The method of claim 5, wherein the apparent transmitter to receiver distance, D, between any one transmitter and any one receiver, and associated with each possible velocity, V, of an acoustic wave arrival originating at said any one transmitter and arriving at said any one receiver is calculated in accordance with the following relations:

$D = D_T + (D_0 - D_T) ((V^2/V_m^2) - 1)^{\frac{1}{2}} ((V_0^2/V_m^2) - 1)^{-\frac{1}{2}}$, for $V > V_m$; and $D = D_T$, for $V \leq V_m$, where $D_T$ is the actual distance between said any one transmitter and said any one receiver, $D_0$ is the apparent distance, associated with the velocity of the acoustic wave arrival identified in step (a), between said any one transmitter and said any one receiver, $V_0$ is the velocity associated with the acoustic wave arrival identified in step (a), and $V_m$ is the velocity of sound in the borehole fluid between said any one transmitter and said any one receiver.

7. The method of claim 5, also including the step of weighting each portion of each of the received signals to be stacked prior to performing the stacking operation, to compensate for increased attenuation of the received signals with increased transmitter to receiver distance.

8. The method of claim 7, in which the weighting is performed by multiplying said each signal by the distance between the receiver associated with said each signal and the transmitter from which the energy in said each signal originated.

9. The method of claim 7, in which the weighting is performed by multiplying said each signal by the quantity $(d)^2$, where d is the distance between the receiver associated with said each signal and the transmitter from which the energy in said each signal originated.

10. A method of producing a display of acoustic well logging signals received during operation in a borehole having a longitudinal axis, traversing a subterranean formation, and containing fluid, of a logging system having at least one acoustic transmitter and at least one receiver, said at least one transmitter and at least one receiver giving rise to a number of acoustic well logging signals each associated with a different depth interval, including the steps of:
 (a) generating a first group of at least two received signals, each signal in said first group containing information regarding the arrival of energy in an acoustic pulse emitted from one of the transmitters;
 (b) generating a second group of at least two received signals, each signal in said group containing information regarding the arrival of energy in an acoustic pulse emitted from one of the transmitters;
 (c) identifying from one of the first or second groups of received signals an acoustic wave arrival and determining a first apparent distance between the transmitter from which energy in said acoustic arrival originated and a first one of the receivers, which first apparent distance is associated with said acoustic wave arrival;
 (d) determining for each received signal, a travel time line, each travel time line being associated with a possible velocity, V, associated with a possible acoustic arrival at the receiver at which the signal was received;
 (e) generating for each of the first and second groups of received signals, and each pair of received signals in each such group associated with a pair of adjacent receivers, a stacked signal having a particular amplitude for each of at least some of the plurality of possible velocities, each said particular amplitude being substantially equal to the sum of the amplitudes of the relevant pair of received signals along the travel time line corresponding to said velocity;
 (f) generating a common depth travel time stack by adding together those stacked signals produced in step (e) which are associated with a common depth interval in the borehole; and
 (g) displaying the common depth travel time stack.

11. The method of claim 10, wherein steps (f) and (g) are repeated to generate, and then display, a common depth travel time stack for each of a plurality of depth intervals in the borehole, each depth interval being one spanned by a pair of adjacent receivers during both steps (a) and (b).

12. The method of claim 10, wherein the apparent distance, D, between said any one of the transmitters and any one of the receivers and associated with velocity, V, is determined in accordance with the following relations:

$$D = D_T + (D_0 - D_T)\ ((V^2/V_m^2) - 1)^{\frac{1}{2}}\ ((V_0^2 - V_m^2) - 1)^{-\frac{1}{2}},\ \text{for } V > V_m;\ \text{and } D = D_T,\ \text{for } V \leq V_m,$$

where $D_T$ is the actual distance between the transmitter and said any one of the receivers, $D_0$ is the first apparent distance identified in step (c) between the transmitter and said first one of the receivers plus the actual distance between said any one of the receivers and said first one of the receivers, $V_0$ is the velocity associated with the acoustic arrival identified in step (c), and $V_m$ is the velocity of sound in the borehole fluid between the transmitter and said any one of the receivers.

13. A method of producing a display of acoustic well logging signals received during operation in a borehole having a longitudinal axis, traversing a subterranean formation, and containing fluid, of a logging system having at least one acoustic transmitter and at least one receiver, said at least one transmitter and at least one receiver giving rise to a number of acoustic well logging signals each associated with a different depth interval, including the steps of:
 (a) generating a first group of at least two received signals, each signal in said first group containing information regarding the arrival of energy in an acoustic pulse emitted from one of the transmitters;
 (b) generating a second group of at least two received signals, each signal in said second group containing information regarding the arrival of energy in an acoustic pulse emitted from one of the transmitters;
 (c) identifying from one of the first or second groups of received signals an acoustic wave arrival and determining a first apparent distance between the transmitter from which energy in said acoustic arrival originated and a first one of the receivers, which first apparent distance is associated with said acoustic wave arrival;
 (d) generating, for each of the first and second groups of received signals, and each pair of received signals in each such group associated with a pair of adjacent receivers, a stacked signal having a particular amplitude for each of at least some of the plurality of possible velocities of an acoustic arrival at the receivers, each said particular amplitude being substantially equal to the sum of the amplitudes of the relevant pair of received signals taken along a travel time line corresponding to the associated velocity;
 (e) generating a common depth travel time stack by adding together those stacked signals produced in step (d) which are associated with a common depth interval in the borehole; and
 (f) displaying the common depth travel time stack.

14. The method of claim 13, wherein steps (e) and (f) are repeated to generate, and then display, a common depth travel time stack for each of a plurality of depth intervals in the borehole, each depth interval being spanned by a pair of adjacent receivers during both steps (a) and (b).

15. The method of claim 10 or 13, also including the step of weighting each portion of each of the received signals to be stacked prior to performing the stacking operation, to compensate for increased attenuation of the received signals with increased transmitter to receiver distance.

16. The method of claim 15, in which the weighting is performed by multiplying said each signal by the distance between the transmitter and the receiver associated with said each signal.

17. The method of claim 15, in which the weighting is performed by multiplying said each signal by the quantity $(d)^2$, where d is the distance between the transmitter and the receiver associated with said each signal.

18. The method of claim 10 or 13 wherein the common depth travel time stack is displayed as a function of inverse velocity.

19. The method of claim 10 or 13 wherein the common depth travel time stack is displayed as a function of porosity.

20. The method of claim 10 or 13 wherein the common depth travel time stack is displayed on a logarithmic scale as a function of inverse velocity.

21. A method of producing a display of acoustic well logging signals received during operation, in a borehole having a longitudinal axis and traversing a subterranean formation, of a logging system having at least one acoustic receiver and at least three acoustic transmitters each held a fixed distance along the longitudinal axis away from each receiver and each of the other transmitters, including the steps of:
(a) sequentially firing each of the transmitters;
(b) generating a first group of received signals, each signal in said first group being indicative of received acoustic energy which originated at a different one of the transmitters;
(c) again sequentially firing each of the transmitters;
(d) generating a second group of received signals, each signal in said second group being indicative of received acoustic energy which originated at a different one of the transmitters;
(e) identifying from one of the first or second groups of received signals an acoustic wave arrival and determining a first apparent distance between a first transmitter from which energy in said acoustic arrival originated and the receiver, which first apparent distance is associated with said acoustic wave arrival;
(f) determining for each of the transmitters and for each of a plurality of possible velocities, V, associated with a possible acoustic arrival at the receiver, the corresponding apparent distance between the transmitter and the receiver, thus determining a plurality of travel time lines for the logging system, each travel time line being associated with a possible velocity, V and one of the transmitters;
(g) generating, for each of the first and second groups of received signals, and each pair of received signals in each such group associated with a pair of adjacent transmitters, a stacked signal having a particular amplitude for each of at least some of the plurality of possible velocities, each said particular amplitude being substantially equal to the sum of the amplitudes of the relevant pair of received signals along the travel time line corresponding to said velocity;
(h) generating a common depth travel time stack by adding together those stacked signals produced in step (g) which are associated with a common depth interval in the borehole; and
(i) displaying the common depth travel time stack.

22. The method of claim 21, wherein steps (h) and (i) are repeated to generate, and then display, a common depth travel time stack for each of a plurality of depth intervals in the borehole, each depth interval being one spanned by a pair of adjacent transmitters during both steps (a) and (c).

23. The method of claim 21, wherein the apparent distance, D, between said any one of the transmitters and the receiver and associated with velocity, V, is determined in accordance with the following relations:
$D = D_T + (D_0 - D_T)((V^2/V_m^2) - 1)^{\frac{1}{2}} (V_0^2 - V_m^2) - 1)^{-\frac{1}{2}}$, for $V > V_m$; and $D = D_T$, for $V \leq V_m$, where $D_T$ is the actual distance between the receiver and said any one of the transmitters, $D_0$ is the first apparent distance identified in step (e) between the receiver and said first transmitter plus the actual distance between said first transmitter any one of the transmitters, $V_0$ is the velocity associated with the acoustic arrival identified in step (e), and $V_m$ is the velocity of sound in the borehole fluid between said any one of the transmitters and the receiver.

24. A method of producing a display of acoustic well logging signals received during operation in a borehole having a longitudinal axis, traversing a subterranean formation, and containing fluid, of a logging system having at least three acoustic transmitters and at least one acoustic receiver each held a fixed distance along the longitudinal axis away from each of the transmitters, including the steps of:
(a) sequentially firing each of the transmitters;
(b) generating a first group of received signals, each signal in said first group containing information regarding the arrival at the receiver of energy from a different one of the transmitters;
(c) again sequentially firing each of the transmitters;
(d) generating a second group of received signals, each signal in said second group containing information regarding the arrival at the receiver of energy from a different one of the transmitters;
(e) identifying from one of the first or second groups of received signals an acoustic wave arrival and determining a first apparent distance between the transmitter from which energy in said acoustic arrival originated and the receiver, which first apparent distance is associated with said acoustic wave arrival;
(f) generating, for each of the first and second groups of received signals, and each pair of received signals in each such group associated with a pair of adjacent transmitters, a stacked signal having a particular amplitude for each of at least some of the plurality of possible velocities of an acoustic arrival at the receiver, each said particular amplitude being substantially equal to the sum of the amplitudes of the relevant pair of received signals taken along a travel time line corresponding to the associated velocity;
(g) generating a common depth travel time stack by adding together those stacked signals produced in step (f) which are associated with a common depth interval in the borehole; and
(h) displaying the common depth travel time stack.

25. The method of claim 24, wherein steps (g) and (h) are repeated to generate, and then display, a common depth travel time stack for each of a plurality of depth intervals in the borehole, each depth interval being spanned by a pair of adjacent transmitters during both steps (a) and (c).

26. The method of claim 21 or 24, also including the step of weighting each portion of each of the received signals to be stacked prior to performing the stacking operation, to compensate for increased attenuation of the received signals with increased transmitter to receiver distance.

27. The method of claim 21 or 24 wherein the common depth travel time stack is displayed as a function of inverse velocity.

28. The method of claim 21 or 24 wherein the common depth travel time stack is displayed as a function of porosity.

29. A method of producing a display of signals received during operation, in a borehole having an axis, containing fluid and traversing a subterranean formation, of an acoustic logging system having at least one acoustic transmitter and at least one acoustic receiver, including the steps of:

(a) generating a first group of at least two received signals, each signal in said first group containing information regarding the arrival of energy in an acoustic signal emitted from a transmitter;

(b) generating a second group of at least two received signals, each signal in said second group containing information regarding the arrival of energy in an acoustic signal emitted from a transmitter;

(c) identifying from one of the first or second groups of received signals an acoustic wave arrival and determining a first apparent distance between the transmitter from which the energy in the acoustic arrival originated and a first one of the receivers, which first apparent distance is associated with said acoustic wave arrival;

(d) for each group of received signals, determining the apparent distance, D, between the associated transmitter and the receiver nearest said transmitter at which one signal in said group was received, where $D_A$ is the actual distance between the associated transmitter and said nearest receiver;

(e) for each group of received signals, digitizing the received signals in said group, each at a sample rate selected so that the ratio, $S_1/S_2$, where $S_1$ is the sample rate at which signals received by a first receiver positioned at a first actual distance, $D_1$, in the direction opposite the associated transmitter away from the point located between the associated transmitter and the first receiver at a distance $D_A$ from the associated transmitter are digitized, and $S_2$ is the sample rate at which signals received by a second receiver positioned at a second actual distance, $D_2$, in the direction opposite from the associated transmitter away from the point located between said second receiver and the associated transmitter are digitized, is substantially equal to the ratio $(D+D_1)/(D+D_2)$;

(f) generating for both the first group and the second group of digitized received signals, a summed digitized signal for a plurality of pairs of digitized received signals, where both digitized signals in each pair belong to the same group and are associated with adjacent receivers, and where each said summed signal includes a digitized point for each of a plurality of possible velocities associated with possible acoustic wave arrivals at the receivers, and the magnitude of the nth such digitized point of the summed signal represents the sum of the nth digitized points of the two digitized signals in the pair, where the consecutive digitized points of each digitized received signal and each digitized summed signal are identified respectively by consecutive values of the index n, where $1 \leq n \leq N$, with N equal to the total number of points in each such digitized signal;

(g) storing the summed digitized signals associated with the first group in a storage unit having an array of memory locations identifiable by row and column indices, such that digitized summed signals associated with adjacent pairs of receivers are stored in adjacent rows, with the adjacent digitized summed signal associated with the receiver pair located higher in the borehole stored in the row having higher row index, and such that consecutive digitized points of each digitized summed signal are stored in adjacent columns;

(h) after step (g), producing a first analog common depth travel time stack by converting the summed digitized signal identified by the lowest row index into analog form;

(i) displaying the first analog common depth travel time stack;

(j) after step (h), shifting each digitized point in the storage unit to a memory location having row index smaller by the integer one than the original row index identifying the original memory location in which each said digitized point was stored in step (g);

(k) after step (j), adding the summed digitized signals associated with the second group to the same memory locations in which the summed digitized signals associated with the first group of digitized received signals were stored in step (g), in a manner such that summed digitized signals associated with adjacent pairs of receivers are stored in adjacent rows with the adjacent signal associated with the receiver pair located higher in the borehole stored in the row having higher row index, and such that consecutive digitized points of each summed digitized signals are stored in adjacent columns;

(l) after step (k), producing a second analog common depth travel time stack by converting the summed digitized signal identified by the lowest row index into analog form; and (m) displaying the second analog common depth travel time stack.

30. The method of claim 29, also including the step of:

(n) weighing each of the digitized points of the digitized received signals, prior to completion of step (f), to compensate for increased attenuation of the received signals with increased transmitter to receiver distance.

31. The method of claim 29, wherein step (f) is accomplished by performing the following steps, for each group of digitized received signals:

storing the digitized received signals of said group in a storage unit having memory locations identifiable by row and column indices, such that digitized signals associated with adjacent receivers are stored in adjacent rows, and consecutive digitized points of each digitized signal are stored in adjacent columns; and generating each summed digitized signal by summing each pair of digitized points having the same column index, which pair is associated with a pair of digitized signals stored in adjacent rows.

* * * * *

UNITED STATES PATENT AND TRADEMARK OFFICE
CERTIFICATE OF CORRECTION

PATENT NO. : 4,672,588

DATED : June 9, 1987

INVENTOR(S) : Dennis E. Willen

It is certified that error appears in the above—identified patent and that said Letters Patent is hereby corrected as shown below:

In the specification, column 6, line 42, delete the formula
"$D=D_T+2(R_H-R_T)((V^2/V_m^2)-1)^{TM}$" and substitute
— $D=D_T+2(R_H-R_T)((V^2/V_m^2)-1)^{1/2}$ —.

In the specification, column 7, line 62, delete the numeral "2" which appears to the left of the parameter "D".

In the specification, column 7, line 63, delete the expression
"$((V_o^2/V_m^2)-1)^{-1/2}$" and substitute — $((V_o^2/V_m^2)-1)^{-1/2}$ —.

In the specification, column 11, line 23, delete "$5D_4$" and replace it by — $D_4$ —.

In the specification, column 11, line 24, add a comma between the two parameters "$D_7$".

In the specification, column 11, line 25, delete "and $D_{12}$ and $D_{12}$" and replace it by — and $D_{12}$ —.

In the specification, column 13, line 67, delete
"$P_v$ is the vertical stress on the portion, $V_s$" substitute — $P_v$ is the vertical stress on the portion, $V_s$ —.

In claim 6, line 8, delete the expression "$((V_o^2/V_m^2)-1/2$" and substitute — $((V_o^2/V_m^2)-1)^{-1/2}$ —.

In claim 12, line 7, delete "$(V_o^2-V_m^2)$" and substitute — $(V_o^2/V_m^2)$ —.

In claim 23, line 6, delete "$(V_o^2-V_m^2)$" and substitute — $(V_o^2/V_m^2)$ —.

UNITED STATES PATENT AND TRADEMARK OFFICE
CERTIFICATE OF CORRECTION

PATENT NO. : 4,672,588
DATED : June 9, 1987
INVENTOR(S) : Dennis E. Willen

It is certified that error appears in the above-identified patent and that said Letters Patent is hereby corrected as shown below:

In claim 30, line 2, delete "weighing" and substitute -- weighting --.

Signed and Sealed this

Twenty-second Day of December, 1987

Attest:

DONALD J. QUIGG

Attesting Officer

Commissioner of Patents and Trademarks